US009327991B2

(12) United States Patent
Hyojo et al.

(10) Patent No.: US 9,327,991 B2
(45) Date of Patent: May 3, 2016

(54) ALUMINIUM HYDROXIDE POWDER AND METHOD FOR PRODUCING SAME

(71) Applicant: SUMITOMO CHEMICAL COMPANY, LIMITED, Chuo-ku, Tokyo (JP)

(72) Inventors: Ayumi Hyojo, Niihama (JP); Kensen Okusako, Niihama (JP); Norifumi Azuma, Niihama (JP); Koji Yamamoto, Niihama (JP); Yoshitaka Kawakami, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/382,675

(22) PCT Filed: Mar. 6, 2013

(86) PCT No.: PCT/JP2013/056164
§ 371 (c)(1),
(2) Date: Sep. 3, 2014

(87) PCT Pub. No.: WO2013/133331
PCT Pub. Date: Sep. 12, 2013

(65) Prior Publication Data
US 2015/0017090 A1 Jan. 15, 2015

(30) Foreign Application Priority Data

Mar. 6, 2012 (JP) .................................. 2012-049450
Apr. 10, 2012 (WO) .................. PCT/JP2012/059775

(51) Int. Cl.
*C01F 7/00* (2006.01)
*C01F 7/36* (2006.01)
*C01F 7/02* (2006.01)

(52) U.S. Cl.
CPC ... *C01F 7/36* (2013.01); *C01F 7/02* (2013.01); *C01P 2002/72* (2013.01); *C01P 2006/10* (2013.01); *C01P 2006/11* (2013.01); *C01P 2006/14* (2013.01); *C01P 2006/16* (2013.01); *C01P 2006/17* (2013.01); *C01P 2006/80* (2013.01)

(58) Field of Classification Search
None
See application file for complete search history.

(56) References Cited

U.S. PATENT DOCUMENTS

| 3,056,725 | A | 10/1962 | Rinse et al. | |
|---|---|---|---|---|
| 4,798,710 | A | 1/1989 | Legrand et al. | |
| 5,055,019 | A | 10/1991 | Meyer et al. | |
| 5,155,085 | A | 10/1992 | Hamano et al. | |
| 5,573,582 | A | 11/1996 | Inui et al. | |
| 7,417,087 | B2 * | 8/2008 | Nippa et al. | 524/437 |
| 7,442,361 | B1 * | 10/2008 | Gloeckler et al. | 423/628 |
| 2010/0047157 | A1 | 2/2010 | Fujita et al. | |
| 2010/0166642 | A1 | 7/2010 | Fujita et al. | |

FOREIGN PATENT DOCUMENTS

| CN | 1236350 A | 11/1999 |
|---|---|---|
| CN | 101506099 A | 8/2009 |
| EP | 0950638 A1 | 10/1999 |
| EP | 1293531 A1 | 3/2003 |
| GB | 850893 A | 10/1960 |
| JP | 54-16397 A | 2/1979 |
| JP | 58-50930 B | 11/1983 |
| JP | 4-270114 A | 9/1992 |
| JP | 8-12325 A | 1/1996 |
| JP | 08-059231 A | 3/1996 |
| JP | 08-301616 A | 11/1996 |
| JP | 3225564 B2 | 8/2001 |
| JP | 2010-47457 A | 3/2010 |
| JP | 2010-168271 A | 8/2010 |
| JP | 2013-060387 A | 4/2013 |
| JP | 2013-060388 A | 4/2013 |
| JP | 2013-060389 A | 4/2013 |
| JP | 2013-060390 A | 4/2013 |
| WO | 2008/090415 A2 | 7/2008 |

OTHER PUBLICATIONS

First Office Action issued Apr. 3, 2015 in counterpart Chinese Patent Application No. 201380012685.5 with translation.
Souichi Kazama, "Process for Producing Ceramics", Ceramics, vol. 17, No. 9, 1982, pp. 764-770 with translation.
Wataru Ishibashi, et al., "Process for Producing High Purity Alumina by Spark Discharge and Properties Thereof", Ceramics, vol. 6, No. 6, 1971, pp. 461-468 with translation.
Akio Kato, et al., "Production and nature of alumina fine particles by vapor phase oxidation decomposition of aluminum chloride", Materials, vol. 21, 1972, pp. 540-543 with translation.
Production Process of Ceramics, Journal of the Ceramics Association, vol. 19, No. 3, 1984, pp. 230-238 with translation.
International Search Report issued Apr. 16, 2013 in International Application No. PCT/JP2013/056164.
International Search Report issued Jun. 5, 2012 in International Application No. PCT/JP2012/059775.
International Preliminary Report on Patentability and Written Opinion issued Sep. 9, 2014 in International Application No. PCT/JP2013/056164.
International Preliminary Report on Patentability and Written Opinion issued Oct. 14, 2014 in International Application No. PCT/JP2012/059775.
Notice of Rejection Reasons issued Sep. 30, 2014 in corresponding Japanese Patent Application No. 2013-042192 with English translation.

(Continued)

*Primary Examiner* — Steven Bos
(74) *Attorney, Agent, or Firm* — Sughrue Mion, PLLC (57) ABSTRACT

The present invention provides an aluminum hydroxide powder having a predetermined cumulative pore volume which falls within a range suited for the production of a high purity alumina, and a method for producing the same. It is possible to produce an aluminum hydroxide powder having high bulk density and high firing efficiency, and an aluminum hydroxide having high shape retention.

3 Claims, 2 Drawing Sheets

(56) References Cited

OTHER PUBLICATIONS

Shuzo Kato, "Process for producing alumina powder for fine ceramics by AACH method", Fine Ceramics, vol. 4, pp. 100-107 with translation, 1983.

Communication dated Oct. 6, 2015 from the European Patent Office issued in European application No. 13758425.6.

Communication dated Feb. 10, 2016 from the European Patent Office issued in corresponding Application No. 13758425.6.

* cited by examiner

ALUMINIUM HYDROXIDE POWDER AND METHOD FOR PRODUCING SAME

CROSS REFERENCE TO RELATED APPLICATIONS

This application is a National Stage of International Application No. PCT/JP2013/056164, filed on Mar. 6, 2013, which claims priority from Japanese Patent Application No. 2012-049450, filed on Mar. 6, 2012, and International Application PCT/JP2012/059775, filed Apr. 10, 2012, the contents of all of which are incorporated herein by reference in their entirety.

TECHNICAL FIELD

The present invention relates to an aluminum hydroxide powder which is suited as a raw material of a high purity alumina compact, and a method for producing the same.

Alumina ($Al_2O_3$) has hitherto been widely used in various applications because of having excellent physical and chemical properties, such as heat resistance, insulation properties, resistance, and corrosion resistance. High purity alumina, which has alumina purity of 99.99% or more and is in the form of fine particles having a uniform particle diameter, has widely been used as a light-transmitting tube for high pressure sodium lamp, single crystal material such as sapphire for watch window, a high strength ceramics tool, an abrasive for magnet tape, and the like.

There have been known, as a method for industrially producing such a high purity alumina raw material powder, a method for hydrolysis of an aluminum alkoxide (for example, Patent Document 1), a method for thermal decomposition of ammonium alum (for example, Non-Patent Document 1), a method for thermal decomposition of ammonium aluminum carbonate (for example, Non-Patent Document 2), a method for underwater spark discharge of aluminum (for example, Non-Patent Document 3), a gas phase oxidation method (for example, Non-Patent Document 4), and the like.

PATENT DOCUMENTS

Patent Document 1: JP 8-301616 A
Patent Document 2: JP 08-12325 A

NON-PATENT DOCUMENTS

Non-Patent Document 1: Soichi Kazama, Ceramics, 17(9), 764 (1982)
Non-Patent Document 2: Shuzo Kato, Fine Ceramics, 4, 100 (1983).
Non-Patent Document 3: Wataru ishibashi, Tetsuya Araki, Katsutoshi Kishimoto, Haruo Kuno, Ceramics, 6(6), 461 (1971)
Non-Patent Document 4: Akio Kato, Sanae Kawazoe, Isao Mochida, Materials, 21, 540 (1972).
Non-Patent Document 5: Production Process of Ceramics, 1984, Journal of the Ceramic Association

DISCLOSURE OF THE INVENTION

Problems to be Solved by the Invention

It is considered to be useful for the production of alumina to form or granulate an aluminum hydroxide serving as an alumina raw material into a predetermined shape to obtain a green compact, followed by firing. However, since a binder is usually used in the case of forming or granulation and there is concern over an adverse influence on purity of the obtained alumina, it is not necessarily easy to simultaneously realize an increase in purity of alumina and facilitation of forming or granulation.

Meanwhile, aluminum hydroxide serving as a raw material for formation of alumina is influenced by a crystal structure of the obtained aluminum hydroxide and the degree of generation of aggregated particles depending on the formation conditions. Aggregated particles included in aluminum hydroxide promote linkage between particles of aluminum hydroxide and abnormal grain growth of crystal grains (see, for example, Non-Patent Document 5). The crystal structure of the aluminum hydroxide and the degree of generation of aggregated particles may also exert an influence on alumina produced using the aluminum hydroxide as a raw material, thus producing alumina including a lot of aggregated particles. In such a case, if coarse particles of aluminum hydroxide are generated in a large amount, grinding efficiency deteriorates, thus failing to obtain desired particle size distribution. Therefore, Patent Document 2 proposes a method for obtaining easily dispersible aluminum hydroxide fine particles with less aggregated particles, utilizing the hydrolysis reaction at low concentration in which a solvent constituting an aluminum alkoxide other than an alcohol is added. However, there is still room for improvement in firing efficiency in the aluminum hydroxide powder obtained by such technique.

Means for Solving the Problems

The present inventors have found that an aluminum hydroxide powder having a certain specific range of pore volume distribution is excellent in formability and is suitable for forming or granulation of a high purity alumina, and also found an aluminum hydroxide having specific pore volume distribution, capable of obtaining a high purity alumina with satisfactory firing efficiency. The present inventors have found that these aluminum hydroxides can be produced by hydrolyzing an aluminum alkoxide under predetermined conditions, thus completing the present invention.

Namely, the present invention includes the following first and second embodiments. The first embodiment includes the following aspects.
<1> An aluminum hydroxide powder, wherein a cumulative pore volume V measured by a mercury penetration method is 1.0 mL/g or more, the cumulative pore volume V being cumulated when a pore radius R is within a range of 0.01 μm or more and 1 μm or less.
<2> The aluminum hydroxide powder according to the above <1>, wherein in a pore distribution curve showing a relation between the pore radius R and a log differential pore volume (dV/d log R) represented by using the pore radius R and the cumulative pore volume V, measured by the mercury penetration method,
the dV/d log R exceeds 0.6 mL/g when R is within an entire range of 0.01 μm or more and 1 μm or less.
<3> The aluminum hydroxide powder according to the above <1> or <2>, wherein the tamped density is 0.10 g/mL or more and 0.25 g/mL or less, and the untamped density is 0.15 g/mL or more and 0.30 g/mL or less.
<4> The aluminum hydroxide powder according to any one of the above <1> to <3>, wherein each amount of Si, Na, Ca, Fe, Cu, and Mg contained as impurities in the aluminum hydroxide powder is 10 ppm by weight or less when converted in terms of impurities in alumina.

<5> A method for producing the aluminum hydroxide powder according to any one of the above <1> to <4>, including:

a first hydrolysis step of adding an aqueous alcohol solution having a water concentration of 5% by weight or more and 30% by weight or less to a solution containing an aluminum alkoxide so that a molar ratio of water/aluminum alkoxide falls within a range of 1.5 or more and 2.0 or less to hydrolyze the aluminum alkoxide;

a second hydrolysis step of separating and recovering an alcohol from the mixed solution after the first hydrolysis step, and adding water or an aqueous alcohol solution so that a molar ratio of water/aluminum alkoxide falls within a range of 1.0 or more and 7.0 or less and a water concentration in the slurry after the hydrolysis becomes less than 10% by weight to hydrolyze the aluminum alkoxide; and a step of removing water and the alcohol from the mixed solution after the second hydrolysis to recover an aluminum hydroxide powder.

<6> The method for producing the aluminum hydroxide powder according to the above <5>, wherein the aluminum alkoxide is aluminum isopropoxide.

<7> The method for producing the aluminum hydroxide powder according to the above <5> or <6>, wherein the alcohol is isopropyl alcohol.

The second embodiment of the present invention includes the following aspects.

<1> An aluminum hydroxide powder, wherein a cumulative pore volume V measured by a mercury penetration method is 0.2 mL/g or more and less than 1.0 mL/g, the cumulative pore volume V being cumulated when a pore radius R is within a range of 0.01 µm or more and 1 µm or less.

<2> The aluminum hydroxide powder according to the above <1>, wherein in a pore distribution curve showing a relation between the pore radius R and a log differential pore volume (dV/d log R) represented by using the pore radius R and the cumulative pore volume V, measured by the mercury penetration method, the dV/d log R is 0.05 mL/g or more and 0.5 mL/g or less when R is within an entire range of 0.01 µm or more and 1 µm or less.

<3> The aluminum hydroxide powder according to the above <1> or <2>, wherein the tamped density is 0.30 g/mL or more and 0.60 g/mL or less.

<4> The aluminum hydroxide powder according to any one of the above <1> to <3>, each amount of Si, Na, Ca, Fe, Cu, and Mg contained as impurities in the aluminum hydroxide powder is 10 ppm by weight or less when converted in terms of impurities in alumina.

Effects of the Invention

According to the first embodiment, it is possible to provide an aluminum hydroxide powder capable of forming or granulating using only water.

The aluminum hydroxide powder according to the second embodiment can prevent generation of reaggregated particles during grinding, mixing of foreign matters, and contamination with impurities since it is easy to be crushed into primary particles because of less aggregated particles. Since the aluminum hydroxide powder has high bulk density and high firing efficiency, it is possible to produce a high purity alumina with satisfactory productivity.

MODE FOR CARRYING OUT THE INVENTION

The present invention will be described in detail below.

A first embodiment of the present invention will be described below. In the aluminum hydroxide powder in the first embodiment, a cumulative pore volume V at a pore radius R within a range of 0.01 µm or more and 1 µm or less measured by a mercury penetration method is 1.0 mL/g or more, and preferably 1.5 mL/g or more. The cumulative pore volume V is 10 mL/g or less, and preferably 3.5 mL/g or less.

In this way, the aluminum hydroxide powder of first embodiment is characterized in that the cumulative pore volume V at the pore radius R within the above range satisfies the above conditions in the measurement by a mercury penetration method, and also exhibits satisfactory shape retention only by addition of water without addition of a binder, and is easily formed or granulated. Therefore, an alumina compact obtained by firing a green compact or granulate of the aluminum hydroxide powder can avoid mixing of impurities derived from the binder, thus making it possible to maintain high purity.

As used herein, aluminum hydroxide includes, in addition to alumina trihydrates such as gibbsite and bayerite, alumina monohydrates such as boehmite and pseudo-boehmite.

The mercury penetration method is a method in which a pressure is applied so as to allow mercury to penetrate into pores of a powder sample, thus obtaining a mercury penetration curve which represents a relation between the pressure applied to mercury and the amount of mercury penetrated into pores, and then a pore distribution curve, a pore volume, and a specific surface area are determined based on the mercury penetration curve. The measurement by the mercury penetration method can be performed using a mercury porosimeter.

Although the reason why the aluminum hydroxide powder of first embodiment exhibits high shape retention by the addition of only water is not completely clear at this stage, it is assumed that incorporation of water into pores in every size enables satisfactory shape retention.

Regarding the aluminum hydroxide powder of first embodiment, in a pore distribution curve showing a relation between a pore radius R and a log differential pore volume (dV/d log R) represented by using the pore radius R and the cumulative pore volume V, measured by a mercury penetration method, the dV/d log R preferably exceeds 0.6 mL/g at R within an entire range of 0.01 µm or more and 1 µm or less. The dV/d log R is preferably less than 2.0 mL/g at R within an entire range of 0.01 µm or more and 1 µm or less.

Here, the pore distribution curve obtained by the measurement of the mercury penetration method is also called a log differential pore volume distribution curve and shows a relation between the magnitude of a pore radius of a sample and the total of volumes of pores at each pore radius. Specifically, the pore distribution curve is obtained by plotting the amount of mercury penetration under each pressure P obtained by the measurement of pore distribution through a mercury penetration method using the abscissa for the pore radius (R [µm]) under each pressure P calculated based on Washburn's equation and using the ordinate for the amount of mercury penetration (dV/d log R [mL/g]) under each pressure P.

Washburn's equation: pore radius $R(m) = -2\gamma \cos \theta / P$ where P: pressure (Pa)

γ: surface tension of mercury ($482 \times 10^{-3}$ N/m)

θ: contact angle of mercury (140 deg)

In the aluminum hydroxide powder of the first embodiment, the tamped density is preferably 0.10 to 0.25 g/mL, and more preferably 0.14 to 0.18 g/mL.

The untamped density is preferably 0.15 to 0.30 g/mL, and more preferably 0.17 to 0.22 g/mL.

Here, "tamped density" is the density obtained in the following manner, namely, a sample (aluminum hydroxide powder) is freely dropped in a vessel (cylinder) having an already-known volume, which is left to stand while preventing vibration, and the mass of the collected sample is determined and this mass is divided by the volume of the same quantity of water, and the tamped density can be determined by the method defined in JIS R 9301-2-3. "Untamped density" is the density obtained in the following manner, namely, the tamped density is measured and then a cylinder containing a sample is dropped 100 times from a predetermined height, thus compressing the sample, followed by calculation from the volume of the sample after compression.

In the aluminum hydroxide powder of first embodiment, each amount of Si, Na, Ca, Fe, Cu, and Mg is preferably 10 ppm by weight or less, and more preferably 5 ppm by weight or less, when expressed in terms of impurities in alumina. The amount of these elements can be measured using solid-state emission spectrometry.

When using an aluminum hydroxide powder as a raw material, not only the amount of impurities derived from a binder, but also the amount of impurities derived from an aluminum hydroxide powder decreases, thus obtaining an alumina compact having higher purity.

The aluminum hydroxide powder of the first embodiment can be easily formed by mixing with water. A weight ratio of water to an aluminum hydroxide powder (water/aluminum hydroxide powder) is decided within a range where excellent formability is achieved, and is usually 1.3 to 2.3, and preferably 1.4 to 2.0.

It is possible to obtain γ-, δ-, or θ-transition alumina by firing the aluminum hydroxide powder having the above-mentioned physical properties of the first embodiment at about 700° C. to about 1,100° C., using known firing devices, for example, a rotary kiln, an instant calcination furnace, a loading type firing furnace, a flow type firing furnace, a tunnel furnace, a vacuum firing furnace, a shuttle furnace, and the like.

When this aluminum hydroxide powder is formed and fired at about 1,100° C. to about 1,400° C., an α-alumina compact is obtained. Such α-alumina compact is suitable for applications, for example, single crystal materials such as sapphire for watch window and LED substrate because of low concentration of impurities.

There is no particular limitation on a method for producing an aluminum hydroxide powder of the first embodiment, and the following production method is suitably employed since an aluminum hydroxide powder having the above-mentioned physical properties can be produced with satisfactory reproducibility.

The method for producing an aluminum hydroxide powder of the first embodiment includes the first hydrolysis step of adding an aqueous alcohol solution having a water concentration of 5% by weight or more and 30% by weight or less to a solution containing an aluminum alkoxide so that a molar ratio of water/aluminum alkoxide falls within a range of 1.5 or more and 2.0 or less, thereby hydrolyzing the aluminum alkoxide; the second hydrolysis step of separating and recovering an alcohol from the mixed solution after the first hydrolysis, and adding water or an aqueous alcohol solution so that a molar ratio of water/aluminum alkoxide falls within a range of 1.0 or more and 7.0 or less and a water concentration in the slurry after the hydrolysis becomes less than 10% by weight, thereby hydrolyzing the aluminum alkoxide; and the step of removing water and the alcohol from the mixed solution after the second hydrolysis, thereby recovering an aluminum hydroxide powder.

The production method of the first embodiment is characterized by performing hydrolysis of an aluminum alkoxide in two stages in a state where a molar ratio of water/aluminum alkoxide is controlled within a given range, and an aluminum hydroxide powder having the above-mentioned physical properties of first embodiment can be obtained by performing such hydrolysis.

It is possible to use, as the aluminum alkoxide serving as a raw material, aluminum ethoxide, aluminum n-propoxide, aluminum isopropoxide, aluminum n-butoxide, aluminum sec-butoxide, aluminum-tert-butoxide, and the like. Among these, aluminum isopropoxide is suitable.

As long as physical properties of the obtained aluminum hydroxide powder are not impaired, an aluminum alkoxide derivative obtained by chemical modification of the aluminum alkoxide, or a mixture of the derivative with the aluminum alkoxide may be used.

Use of an aqueous alcohol solution in the hydrolysis enables mild hydrolysis without causing rapid exothermic reaction by gradual progress of a hydrolysis treatment to the aluminum alkoxide.

Examples of the alcohol used in the production method of the first embodiment include a monohydric alcohol having 1 to 8 carbon atoms, and preferably 1 to 4 carbon atoms. Specific examples thereof include an alcohol represented by the following formula). Of these, isopropyl alcohol is particularly preferable.

$$R_1OH \qquad (i)$$

In the formula, $R_1$ is at least one selected from the group consisting of a methyl group, an ethyl group, a normal propyl group, an isopropyl group, a normal butyl group, an isobutyl group, a neobutyl group, a normal pentyl group, an isopentyl group, a neopentyl group, a normal hexyl group, an isohexyl group, a neohexyl group, a normal heptyl group, an isoheptyl group, a neoheptyl group, a normal octyl group, an isooctyl group, and a neooctyl group, preferably a methyl group, an ethyl group, a normal propyl group, an isopropyl group, a normal butyl group, an isobutyl group, or a neobutyl group each having 1 to 4 carbon atoms, and more preferably an isopropyl group.

In the case of the hydrolysis reaction, as long as physical properties of the obtained aluminum hydroxide powder are not impaired, surface charge controllers such as an acid and a base, dispersing agents, and surfactants such as an emulsifier can also be added.

Various physical properties such as degree of completion of the hydrolysis reaction, and a crystal form of an aluminum hydroxide in the obtained powder depend on a molar ratio of an aluminum alkoxide to water, and depend on the kind and amount when containing a chemical modifier. As mentioned above, the production method of the first embodiment is characterized by performing hydrolysis in two stages, and it is possible to produce an aluminum hydroxide powder of the first embodiment by restricting a ratio of an aluminum alkoxide to water and the hydrolysis reaction is partially stopped using an aqueous alcohol solution in the first hydrolysis step, and then the hydrolysis reaction is allowed to proceed in the second hydrolysis step.

One of features of the production method of the first embodiment lies in the fact that an aqueous alcohol solution is added instead of water in the first hydrolysis step.

The concentration of water in the aqueous alcohol solution to be added is 5 to 30% by weight, preferably 5 to 20% by weight, and more preferably 5 to 10% by weight.

The concentration of water in the aqueous alcohol solution of less than 5% by weight leads to insufficient hydrolysis, while the concentration of more than 30% by weight leads to the progress of the reaction before sufficient mixing with an aluminum alkoxide, thus causing a problem such as non-uniform hydrolysis.

In the first hydrolysis step, a molar ratio of an aluminum alkoxide to water [water/aluminum alkoxide] is 1.5 to 2.0, and preferably 1.6 to 1.8.

If the molar ratio of an aluminum alkoxide to water in the first hydrolysis step deviates from the above range, the hydrolysis reaction of the aluminum alkoxide incompletely or excessively proceeds, leading to excess hydrolysis before the second hydrolysis step, thus failing to obtain an aluminum hydroxide powder having the objective physical properties.

A solution containing an aluminum alkoxide serving as a raw material may contain only an aluminum alkoxide, or may contain an alcohol for the purpose of enhancing miscibility with the aqueous alcohol solution to be added. The alcohol is preferably the same as that in the aqueous alcohol solution to be added.

In the case of containing an alcohol, a molar ratio of an alcohol to an aluminum alkoxide [alcohol/aluminum alkoxide] in the solution containing an aluminum alkoxide is not particularly limited as long as an adverse influence is not exerted on the hydrolysis reaction in the first hydrolysis step, and is usually 0 to 1.5.

There is no limitation on the hydrolysis reaction temperature in the first hydrolysis step since the solubility of the aluminum alkoxide in the alcohol varies depending on the kind of the aluminum alkoxide and the alcohol to be used, and hydrolysis reaction temperature is, for example, normal temperature to the temperature which is a boiling point of a solvent or lower.

In the second hydrolysis step, the alcohol is separated and recovered from the mixed solution after the first hydrolysis, and hydrolysis is performed by adding water in a molar ratio of water/aluminum alkoxide of 1.0 to 7.0, and preferably 1.5 to 6.5. Here, a molar ratio of water/aluminum alkoxide is a molar ratio of water added in the second hydrolysis step to an aluminum alkoxide charge in the first hydrolysis step.

An aluminum hydroxide having the objective physical properties is produced by performing hydrolysis after separating and recovering the alcohol from the mixed solution after the first hydrolysis.

Water to be added may be added in the form of an aqueous alcohol solution. In this case, there is no particular limitation on the concentration of the aqueous alcohol solution as long as the alcohol contained therein does not exert an adverse influence on the hydrolysis reaction in the second hydrolysis step. Usually, the concentration of water is 5 to 100% by weight.

In the production method of the first embodiment, the concentration of water contained in the slurry after completion of the second hydrolysis step is less than 10% by weight based on 100% by weight of the entire amount of the slurry.

Examples of recovering or removing the alcohol or the aqueous alcohol solution after the first hydrolysis and the second hydrolysis include, but are not particularly limited to, a method in which the product after hydrolysis is passed through a column packed with an ion-exchange resin, and a method in which a solvent is vaporized by heating the product.

After the first hydrolysis, a required amount of the alcohol may be appropriately recovered.

There is also no limitation on the hydrolysis reaction temperature in the second hydrolysis step since the solubility of the aluminum alkoxide in the alcohol varies depending on the kind of the aluminum alkoxide and the alcohol to be used, and hydrolysis reaction temperature is, for example, normal temperature to the temperature which is a boiling point of a solvent or lower.

After completion of the reaction second hydrolysis, the mixed solution containing aluminum hydroxide may be subjected to an aging treatment. The aging treatment may be performed by allowing the mixed solution to stand at a normal temperature to a hydrolysis temperature for 30 minutes or more, and usually 1 hour to 1 day.

Water or alcohol (unreacted alkoxide if contained) is removed from the mixed solution containing an aluminum hydroxide powder produced after the second hydrolysis step to recover an aluminum hydroxide powder. Aluminum hydroxide can be obtained as a powder from the mixed solution by a conventional method such as filtration or drying.

The second embodiment of the present invention will be described below.

In the aluminum hydroxide powder of the second embodiment, a cumulative pore volume V at a pore radius R within a range of 0.01 μm or more and 1 μm or less measured by a mercury penetration method is 0.2 mL/g or more and less than 1.0 mL/g, and preferably 0.2 mL/g or more and less than 0.6 mL/g.

In this way, the aluminum hydroxide powder of the second embodiment is characterized in that the cumulative pore volume V at the pore radius within the above range satisfies the above conditions in the measurement by a mercury penetration method. If the cumulative pore volume V is lower than 0.2 mL/g, firing efficiency is improved, but firing efficiency significantly deteriorates due to an increase in the amount of coarse particles generated. On the other hand, if the cumulative pore volume V is 1.0 mL/g or more, generation of coarse particles can be sufficiently suppressed, but firing efficiency becomes insufficient.

Therefore, the cumulative pore volume V falling within the above range enables efficient grinding while maintaining firing efficiency.

"Firing efficiency" is efficiency to obtain a fired material from a raw material. When using the same firing facility (firing furnace, vessel), firing efficiency increases as the amount of the fired material obtained by a single firing treatment increases. Specific method for evaluation of firing efficiency will be mentioned in Examples.

The mercury penetration method is a method in which pressure is applied so as to allow mercury to penetrate into pores of a powder sample, thus obtaining a mercury penetration curve which represents a relation between the pressure applied to mercury and the amount of mercury penetrated into pores, and then a pore distribution curve, a pore volume, and a specific surface area are determined based on the mercury penetration curve. The measurement by the mercury penetration method can be performed using a mercury porosimeter.

Regarding the aluminum hydroxide powder of the second embodiment, in a pore distribution curve showing a relation between a pore radius R and a log differential pore volume (dV/d log R) represented by using the pore radius R and the cumulative pore volume V, measured by a mercury penetration method, the dV/d log R is preferably 0.05 mL/g or more and 0.5 mL/g or less at R within an entire range of 0.01 μm or more and 1 μm or less. The dV/d log R is more preferably 0.1 mL/g or more and 0.5 mL/g or less, and still more preferably 0.15 mL/g or more and 0.4 mL/g or less.

Here, the pore distribution curve obtained by the measurement of the mercury penetration method is also called a log differential pore volume distribution curve and shows a relation between the magnitude of a pore radius of a sample and the total of volumes of pores at each pore radius. Specifically, the pore distribution curve is obtained by plotting the amount of mercury penetration under each pressure P obtained by the measurement of pore distribution through a mercury penetration method using the abscissa for the pore radius (R [μm]) under each pressure P calculated based on Washburn's equation and using the ordinate for the amount of mercury penetration (dV/d log R [mL/g]) under each pressure P.

Washburn's equation: pore radius $R(m)=-2\gamma \cos \theta/P$ where P: pressure (Pa)

γ: surface tension of mercury ($482 \times 10^{-3}$ N/m)

θ: contact angle of mercury (140 deg)

In the aluminum hydroxide powder of the second embodiment, the tamped density is preferably 0.30 to 0.60 g/mL, and more preferably 0.30 to 0.50 g/mL.

Here, "tamped density" is the density obtained in the following manner, namely, a sample (aluminum hydroxide powder) is freely dropped in a vessel (cylinder) having an already-known volume, which is left to stand while preventing vibration, and the mass of the collected sample is determined and this mass is divided by the volume of the same quantity of water, and the tamped density can be determined by the method defined in JIS R 9301-2-3.

In the aluminum hydroxide powder of second embodiment, each amount of Si, Na, Ca, Fe, Cu, and Mg is preferably 10 ppm by weight or less, and more preferably 5 ppm by weight or less, when expressed in terms of impurities in alumina. The amount of these elements can be measured using solid-state emission spectrometry.

When using such aluminum hydroxide powder as a raw material, the amount of impurities derived from an aluminum hydroxide powder decreases, thus obtaining an alumina compact having higher purity.

The aluminum hydroxide powder of the second embodiment can be easily formed by mixing with water. A weight ratio of water to an aluminum hydroxide powder (water/aluminum hydroxide powder) is decided within a range where excellent formability is achieved, and is usually 1.3 to 2.3, and preferably 1.4 to 2.0.

It is possible to obtain γ-, δ-, or θ-transition alumina by firing the aluminum hydroxide powder having the above-mentioned physical properties of the second embodiment at about 700° C. to about 1,100° C., using known firing devices, for example, a rotary kiln, an instant calcination furnace, a loading type firing furnace, a flow type firing furnace, a tunnel furnace, a vacuum firing for ace, a shuttle furnace, and the like.

When this aluminum hydroxide powder is formed and fired at about 1,100° C. to about 1,400° C., an α-alumina compact is obtained. Such α-alumina compact is suitable for applications, for example, single crystal materials such as sapphire for watch window and LED substrate because of low concentration of impurities.

There is no particular limitation on the method for producing an aluminum hydroxide powder of the second embodiment, and the following production method is suitably employed since an aluminum hydroxide powder having the above-mentioned physical properties can be produced with satisfactory reproducibility.

There is no particular limitation on the aluminum hydroxide powder of the second embodiment as long as it exhibits the above-mentioned physical properties.

A suitable method for producing an aluminum hydroxide powder of the second embodiment will be mentioned.

Suitable method for producing an aluminum hydroxide powder of the second embodiment (hereinafter referred to as "production method of second embodiment") includes the step of adding an aqueous alcohol solution having a water concentration of 5% by weight or more and 80% by weight or 1000 solution containing an aluminum alkoxide so that a molar ratio of water/aluminum alkoxide falls within a range of 2.5 or more and 7.0 or less, thereby performing hydrolysis; and the step of removing water and the alcohol from the mixed solution after the second hydrolysis, thereby recovering an aluminum hydroxide powder.

The production method of the second embodiment is characterized by performing hydrolysis of an aluminum alkoxide in two stages in a state where a molar ratio of water/aluminum alkoxide is controlled within a given range.

Specifically, desired physical properties can be obtained by passing through the first hydrolysis step of hydrolyzing by adding so that a molar ratio of water/aluminum alkoxide falls within a range of 1.5 or more and 2.0 or less; the step of stirring and aging the mixed solution after the first hydrolysis; and the second hydrolysis step of hydrolyzing by adding water or an aqueous alcohol solution so that a molar ratio of water/aluminum alkoxide falls within a range of 1.0 or more and 7.0 or less. Here, a molar ratio of water/aluminum alkoxide is a molar ratio of water added in the first hydrolysis step to the initial charge amount of an aluminum alkoxide.

The solvent can also be recovered after the first hydrolysis.

It is possible to use, as the aluminum alkoxide serving as a raw material, aluminum ethoxide, aluminum n-propoxide, aluminum isopropoxide, aluminum n-butoxide, aluminum sec-butoxide, aluminum-tert-butoxide, and the like.

Among these, aluminum isopropoxide is suitable.

As long as physical properties of the obtained aluminum hydroxide powder are not impaired, an aluminum alkoxide derivative obtained by chemical modification of the aluminum alkoxide, or a mixture of the derivative with the aluminum alkoxide may be used.

Use of an aqueous alcohol solution in the hydrolysis enables mild hydrolysis without causing rapid exothermic reaction by gradual progress of a hydrolysis treatment to the aluminum alkoxide.

Examples of the alcohol used in the production method of the second embodiment include a monohydric alcohol having 1 to 8 carbon atoms, and preferably 1 to 4 carbon atoms. Specific examples thereof include an alcohol represented by the following formula (i). Of these, isopropyl alcohol is particularly preferable. These alcohols may be used alone, or two or more kinds of them may be used in combination.

$$R_1OH \quad \text{(i)}$$

In the formula, $R_1$ is at least one selected from the group consisting of a methyl group, an ethyl group, a normal propyl group, an isopropyl group, a normal butyl group, an isobutyl group, a neobutyl group, a normal pentyl group, an isopentyl group, a neopentyl group, a normal hexyl group, an isohexyl group, a neohexyl group, a normal heptyl group, an isopentyl group, a neoheptyl group, a normal octyl group, an isooctyl group, and a neooctyl group, preferably a methyl group, an ethyl group, a normal propyl group, an isopropyl group, a normal butyl group, an isobutyl group, or a neobutyl group each having 1 to 4 carbon atoms, and more preferably an isopropyl group.

In the case of the hydrolysis reaction, as long as physical properties of the obtained aluminum hydroxide powder are not impaired, surface charge controllers such as an acid and a base, dispersing agents, and surfactants such as an emulsifier can also be added.

Various physical properties such as degree of completion of the hydrolysis reaction, and a crystal form of an aluminum hydroxide in the obtained powder depend on a molar ratio of an aluminum alkoxide to water, and depend on the kind and amount when containing a chemical modifier. As mentioned above, the production method of the present invention is characterized by performing hydrolysis in two stages, and it is possible to form an aluminum hydroxide powder of the present invention by restricting a ratio of an aluminum alkoxide to water and the hydrolysis reaction is partially stopped using an aqueous alcohol solution in the first hydrolysis step, and then the hydrolysis reaction is allowed to proceed in the second hydrolysis step.

One of features of the production method of the second embodiment lies in the fact that an aqueous alcohol solution is added instead of water in the first hydrolysis step.

The concentration of water in the aqueous alcohol solution to be added is 5 to 80% by weight, preferably 5 to 50% by weight, and more preferably 5 to 30% by weight.

The concentration of water in the aqueous alcohol solution of less than 5% by weight leads to insufficient hydrolysis, while the concentration of more than 80% by weight leads to the progress of the reaction before sufficient mixing with an aluminum alkoxide, resulting in non-uniform hydrolysis. Therefore, agglomerated particles are likely to be generated in the alumina powder after firing, resulting in deterioration of grindability.

In the first hydrolysis step, a molar ratio of an aluminum alkoxide to water [water/aluminum alkoxide] is 1.5 to 2.0, and preferably 1.6 to 1.8.

If the molar ratio of an aluminum alkoxide to water in the first hydrolysis step deviates from the above range, the hydrolysis reaction of the aluminum alkoxide incompletely or excessively proceeds, leading to excess hydrolysis before the second hydrolysis step, thus failing to obtain an aluminum hydroxide powder having the objective physical properties.

A solution containing an aluminum alkoxide serving as a raw material may contain only an aluminum alkoxide, or may contain an alcohol for the purpose of enhancing miscibility with the aqueous alcohol solution to be added. The alcohol is preferably the same as that in the aqueous alcohol solution to be added.

In the case of containing an alcohol, a molar ratio of an alcohol to an aluminum alkoxide [alcohol/aluminum alkoxide] in the solution containing an aluminum alkoxide is not particularly limited as long as an adverse influence is not exerted on the hydrolysis reaction in the first hydrolysis step, and is usually 0 to 1.5.

There is no limitation on the hydrolysis reaction temperature in the first hydrolysis step since the solubility of the aluminum alkoxide in the alcohol varies depending on the kind of the aluminum alkoxide and the alcohol to be used, and the hydrolysis reaction temperature is, for example, from the normal temperature to the temperature which is a boiling point of a solvent or lower.

In the second hydrolysis step, the alcohol is separated and recovered from the mixed solution after the first hydrolysis, and hydrolysis is performed by adding water in a molar ratio of water/aluminum alkoxide of 1.0 to 7.0, and preferably 1.5 to 6.5. Here, a molar ratio of water/aluminum alkoxide is a molar ratio of water added in the second hydrolysis step to an aluminum alkoxide charge in the first hydrolysis step.

An aluminum hydroxide having the objective physical properties is formed by performing hydrolysis after separating and recovering the alcohol from the mixed solution after the first hydrolysis.

Water to be added may be added in the form of an aqueous alcohol solution. In this case, there is no particular limitation on the concentration of the aqueous alcohol solution as long as the alcohol contained therein does not exert an adverse influence on the hydrolysis reaction in the second hydrolysis step. Usually, the concentration of water is 5 to 100% by weight.

Here, it is known that the concentration of water contained in the slurry after completion of the second hydrolysis step significantly exerts an influence on the tamped density, and the concentration of water preferably fails within a range of 10% by weight to 25% by weight based on 100% by weight of the entire amount of the slurry, and more preferably falls within a range of 12% by weight to 20% by weight when the alcohol is particularly isopropyl alcohol.

If the concentration of water in the slurry after completion of the hydrolysis step is less than 10% by weight, firing efficiency may become insufficient since the tamped density decreases. If the concentration of water exceeds 25% by weight, grinding efficiency may become insufficient since a large amount of aggregates are generated.

Examples of recovering or removing the alcohol or the aqueous alcohol solution after the first hydrolysis and the second hydrolysis include, but are not particularly limited to, a method in which the product after hydrolysis is passed through a column packed with an ion-exchange resin, and a method in which a solvent is vaporized by heating the product.

After the first hydrolysis, a required amount of the alcohol may be appropriately recovered.

There is also no limitation on the hydrolysis reaction temperature in the second hydrolysis step since the solubility of the aluminum alkoxide in the alcohol varies depending on the kind of the aluminum alkoxide and the alcohol to be used, and the hydrolysis reaction temperature is, for example, from the normal temperature to the temperature which is a boiling point of a solvent or lower.

After completion of the reaction second hydrolysis, the mixed solution containing aluminum hydroxide may be subjected to an aging treatment. The aging treatment may be performed by allowing the mixed solution to stand at a normal temperature to a hydrolysis temperature for 30 minutes or more, and usually 1 hour to 1 day.

Water or alcohol (unreacted alkoxide if contained) is removed from the mixed solution containing an aluminum hydroxide powder produced after the second hydrolysis step to recover an aluminum hydroxide powder. Aluminum hydroxide can be obtained as a powder from the mixed solution by a conventional method such as filtration or drying.

A description will be made of the firing step of firing an aluminum hydroxide powder of the second embodiment to form an alumina fired substance. Firing of aluminum hydroxide enables formation of α-alumina as a high temperature stable phase via an intermediate alumina (γ-alumina, δ-alumina, θ-alumina). Unlike transition between intermediate aluminas, transition from the intermediate alumina to α-alumina is transition requiring rearrangement of filling of oxygen, and therefore requires high temperature.

There is no particular limitation on conditions of a firing treatment in the firing step, thermal energy required to phase transition of aluminum hydroxide into alumina is applied. For example, firing is performed at a temperature of 1,200° C. or higher over 2 hours or more. Under these conditions, aluminum hydroxide of the present invention is fired, thus making it possible to prevent generation of alumina aggregates which are firmly bonded each other and is scarcely ground. Under conditions of a grinding treatment in the below-mentioned grinding step, grinding is performed, thus making it possible to obtain a high purity alumina powder with less aggregated particles.

There is no particular limitation on the temperature rising rate when the temperature is raised to a predetermined firing temperature and, for example, the temperature rising rate is set at 30 to 500° C./hour.

A firing treatment can be applied to aluminum hydroxide using, for example, a firing furnace. It is possible to use, as the firing furnace, material stationary firing furnaces, for example, a tunnel kiln, a batch ventilation flow type box type firing furnace, a batch parallel flow type box type firing furnace, and the like.

There is no particular limitation on firing atmosphere, and the firing treatment may be performed under either an inert atmosphere such as a nitrogen gas or an argon gas, or a reducing atmosphere, in addition to atmospheric air.

In the firing step, prior to the firing treatment, an alumina fired substance may be produced by granulating aluminum hydroxide, subjecting the obtained granulate to preliminary drying, and filling a firing vessel made of a high purity alumina with the preliminary dried granulate, followed by firing.

In this way, it is possible to reduce loss due to scattering during firing by firing after subjecting the obtained granulate of aluminum hydroxide to preliminary drying and filling a firing vessel with the preliminary dried granulate. It is also possible to efficiently performing an operation of filling a firing vessel by subjecting the granulate obtained by granulating aluminum hydroxide to preliminary drying.

There is no particular limitation on a firing vessel and, for example, it is possible to use a firing vessel having a square shape, a bottomed circular shape, or a polygon column shaped sheath. The firing vessel is preferably made of alumina ceramics. Use of the firing vessel made of alumina ceramics enables prevention of contamination of alumina during firing, thus obtaining a high purity alumina.

The obtained α alumina firmed substance may sometimes be aggregated in a state where an average particle diameter exceeds 10 μm. In that case, the α alumina fired substance is preferably ground into an α alumina powder having an average particle diameter of 1 μm or less.

The α alumina fired substance can be ground using known devices, for example, a vibrating mill, a ball mill, a jet mill, and the like. It is possible to employ either a method of grinding in a dry state or a method of grinding in a wet state, and grinding using a jet mill is preferable. In the case of grinding using a jet mill, the content of coarse particles in size of 20 μm or more in the α alumina powder can be controlled to 10 ppm or less.

In view of less contamination of the obtained a alumina powder, a surface in contact with a alumina of a grinding device is preferably composed of a material of a high purity a alumina or lined with a resin.

In the case of grinding using a medium stirring mill, a grinding medium used therefor is also preferably composed of a material of a high purity α alumina.

The content of each of Si, Na, Ca, Fe, Cu, and Mg in this alumina is 10 ppm or less. As mentioned above, these impurities can be measured by emission spectrometry.

This alumina has a BET specific surface area of 1 to 10 $m^2/g$. The BET specific surface area can be determined by a nitrogen adsorption method in accordance with the method defined in JIS-Z-8830.

EXAMPLES

The first embodiment of the present invention will be described by way of Examples, but the present invention is not limited to the following Examples as long as they do not change the gist thereof.

Physical properties of samples were evaluated by the following procedures.
(1) Pore Volume/Pore Radius R/Pore Distribution Curve Samples to be supplied to the measurement were dried by a dryer at 120° C. for 4 hours, and the weight after drying was precisely weighed and regarded as a sample weight. The dried samples were set in cells of a pore volume analyzer ("AutoPore III9420", manufactured by Micromeritics Instrument Corporation). After controlling the pressure inside the cell system to 50 μmHg or less, mercury was filled into the system and then the pressure was stepwisely added to cells within a range from 0.007 MPa to 414 MPa. The amount of mercury penetration under each pressure was measured by setting the penetration equilibrium waiting time of mercury at 10 seconds.

The cumulative pore volume (mL/g) was determined by dividing the total amount of mercury penetration (mL) when the pressure was applied within a range from 0.007 MPa to 414 MPa by the sample weight (g).

Regarding a pore radius R (μm), the pore radius R (μm) under each pressure P was calculated from the amount of mercury penetration under each pressure P based on the above-mentioned Washburn's equation. Furthermore, using the abscissa for the pore radius (R [μm]) under each pressure P calculated based on Washburn's equation and using the ordinate for the amount of mercury penetration (dV/d log R [mL/g]) under each pressure P, the measured values were plotted to obtain a pore distribution curve.
(2) Bulk Density A tamped density and an untamped density were measured by the following procedures.
"Tamped Density"

In a 10 mL measuring cylinder, 9 to 10 mL of a sample was charged and the weight (g) of the sample is measured. The volume (mL) of the sample is measured when a lid is put on a measuring cylinder and, after turning upside down and returning, the sample is freely dropped. The operation of turning upside down and returning is repeated three times and an average volume (mL) is determined. The value of sample weight/sample average volume is regarded as a tamped density (mL/g)
"Untamped Density"

After measuring the tamped density, the measuring cylinder containing the sample is freely dropped 100 times on a hard rubber board from the height of 3 cm, and then the volume (mL) of the sample is measured. The value of sample weight/sample volume is regarded as an untamped density (mL/g).
(3) Composition Analysis (Measurement of Amount of Impurities)

A sample was calcined at 1,100° C. for about 1 hour and mixed with an Ultra Carbon powder. After grinding using acrylic balls, the content of each of Si, Na, Ca, Fe, Cu, and Mg was determined by measuring the mixed sample by solid-state emission spectrometry (using THERMO Jarrell Ash CID-DCA AURORA).
(4) Measurement of Powder X-Ray Diffraction In an X-ray diffraction measurement of a sample, RINT-2200 manufactured by Rigaku Corporation was used. A CuKα radiation source was used as an X-ray radiation source. An exclusive folder was filled with the sample and the measurement was performed at a diffraction angle 2θ within a range of 20 to 70° to obtain a powder X-ray diffraction pattern.

1. Production of Aluminum Hydroxide Powder

Test Example 1

To a mixed solution of 100.0 parts by weight of aluminum isopropoxide and 11.1 parts by weight of isopropyl alcohol, an aqueous alcohol solution of 15.0 parts by weight of water and 165.7 parts by weight of isopropyl alcohol was added, thus performing hydrolysis (a molar ratio of water/aluminum alkoxide=1.7, the concentration of water in an aqueous alcohol solution is 8.3% by weight).

Then, 99.3 parts by weight of isopropyl alcohol was separated and recovered by distillation, and an aqueous alcohol solution of 24.9 parts by weight of water and 64.2 parts by weight of isopropyl alcohol was added, thus performing hydrolysis (a molar ratio of water/aluminum alkoxide=2.8). After completion of the hydrolysis step, the concentration of water in the slurry was 7.8% by weight.

Figure 1:
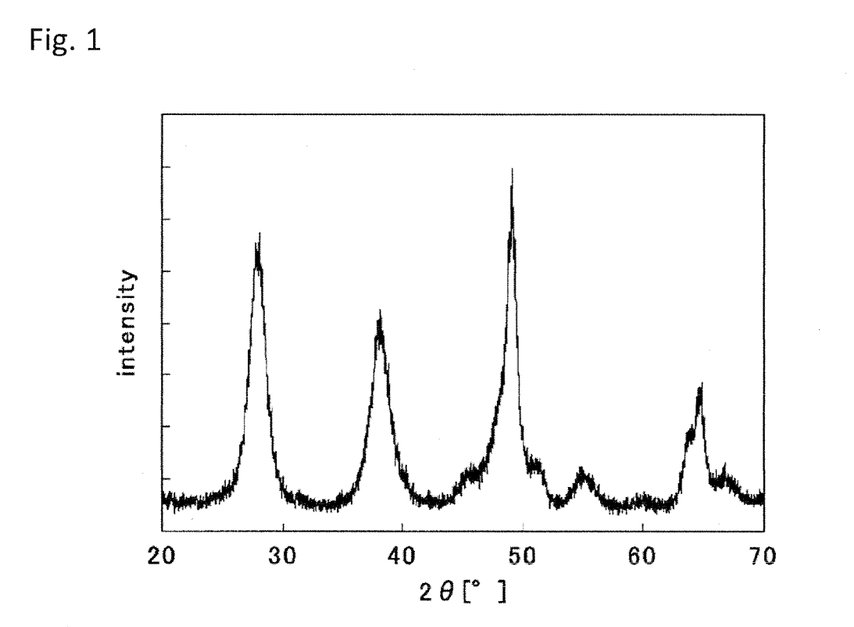
FIG. 1 is an X-ray diffraction pattern of an aluminum hydroxide powder of Test Example 1.

Water and isopropyl alcohol in the obtained suspension containing aluminum hydroxide, water, and isopropyl alcohol were removed to obtain an aluminum hydroxide powder of Test Example 1. A crystal phase other than aluminum hydroxide was not confirmed from the powder X-ray diffraction pattern shown in FIG. 1.

Test Example 2

In the same manner as in Test Example 1, except that the amount of water at the time of second hydrolysis was changed to 12.5 parts by weight (a molar ratio of water/aluminum alkoxide=1.4), an aluminum hydroxide powder of Test Example 2 was obtained. After completion of the hydrolysis step, the concentration of water in the slurry was 3.6% by weight. As a result of the evaluation by an X-ray diffraction method, a crystal phase other than aluminum hydroxide was not confirmed.

Test Example 3

In the same manner as in Test Example 1, except that the amount of water at the time of second hydrolysis was changed to 55.5 parts by weight (a molar ratio of water/aluminum alkoxide=6.3), an aluminum hydroxide powder of Test Example 3 was obtained. After completion of the hydrolysis step, the concentration of water in the slurry was 16.9% by weight. As a result of the evaluation by an X-ray diffraction method, a crystal phase other than aluminum hydroxide was not confirmed.

Test Example 4

To a mixed solution of 100.0 parts by weight of aluminum isopropoxide and 50.0 parts by weight of sopropyl alcohol, an aqueous alcohol solution of 15.0 parts by weight of water and 173.0 parts by weight of isopropyl alcohol was added, thus performing hydrolysis (a molar ratio of water/aluminum alkoxide=1.7, the concentration of water in an aqueous alcohol solution is 8.0% by weight).

Then, 138.2 parts by weight of isopropyl alcohol was separated and recovered by distillation, and an aqueous alcohol solution of 55.5 parts by weight of water and 41.7 parts by weight of isopropyl alcohol was added, thus performing hydrolysis (a molar ratio of water/aluminum alkoxide=6.3). After completion of the hydrolysis step, the concentration of water in the slurry was 17.7% by weight.

Water and isopropyl alcohol in the obtained suspension containing aluminum hydroxide, water, and isopropyl alcohol were removed to obtain an aluminum hydroxide powder of Test Example 4. As a result of the evaluation by an X-ray diffraction method, a crystal phase other than aluminum hydroxide was not confirmed.

Test Example 5

In the same manner as in Test Example 4, except that the amount of water at the time of second hydrolysis was changed to 73.2 parts by weight (a molar ratio of water/aluminum alkoxide=8.3) and the amount of isopropyl alcohol was changed to 55.1 parts by weight, an aluminum hydroxide powder of Test Example 5 was obtained. After completion of the hydrolysis step, the concentration of water in the slurry was 21.9% by weight. As a result of the evaluation by an X-ray diffraction method, a crystal phase other than aluminum hydroxide was not confirmed.

2. Evaluation (Cumulative Pore Volume)

A cumulative pore volume V' in the entire measurement range of Test Example 1 was 3.29 mL/g, and a cumulative pore volume V at a pore radius R within a range of 0.01 to 1 μm was 1.77 mL/g.

A cumulative pore volume V' in the entire measurement range of Test Example 2 was 4.08 mL/g, and a cumulative pore volume V at a pore radius R within a range of 0.01 to 1 μm was 2.12 mL/g.

A cumulative pore volume V' in the entire measurement range of Test Example 3 was 2.32 mL/g, and a cumulative pore volume V at a pore radius R within a range of 0.01 to 1 μm was 0.86 mL/g.

A cumulative pore volume V' in the entire measurement range of Test Example 4 was 2.41 mL/g, and a cumulative pore volume V at a pore radius IR within a range of 0.01 to 1 μm was 0.64 mL/g.

A cumulative pore volume V' in the entire measurement range of Test Example 5 was 0.99 mL/g, and a cumulative pore volume V at a pore radius R within a range of 0.01 to 1 μm was 0.22 mL/g.

(Pore Distribution Curve)

Figure 2:
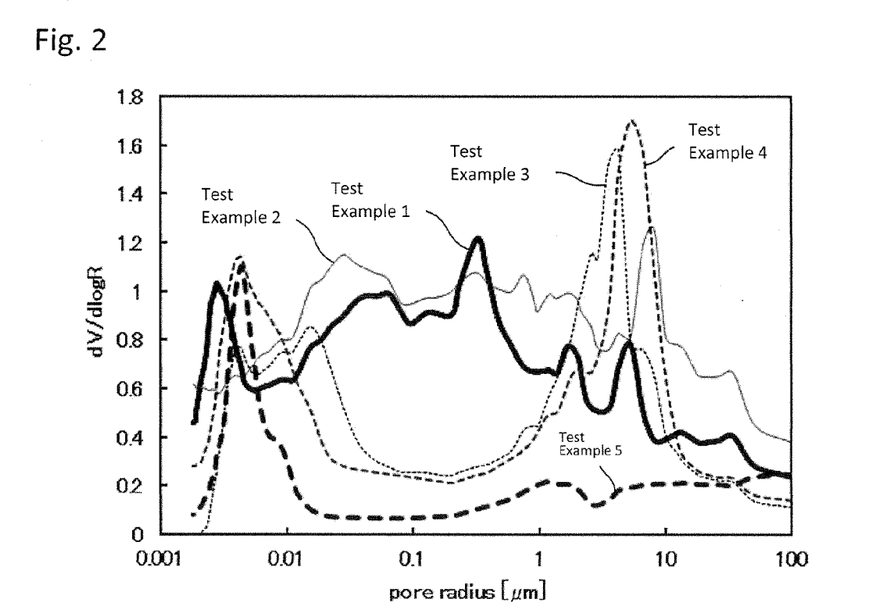
FIG. 2 is a pore distribution curve of aluminum hydroxide powders of Test Examples 1 to 5.

Pore distribution curves of aluminum hydroxide powders of Test Examples 1 to 5 are shown in FIG. 2.

As is apparent from FIG. 2, in the pore distribution curves of Test Examples 3 to 5, projecting peaks are confirmed at a pore radius R of about 5 to 7 μm in Test Examples 3 and 4 and a projecting peak is confirmed at a pore radius R of about 0.004 μm in Test Example 5, and dV/d log R does not exceed 0.6 mL/g at R within a range of 0.01 to 1 μm.

On the other hand, in the pore distribution curves of Test Example 1 and Test Example 2, pores also exist in the range other than the projecting peaks confirmed in Test Examples 3 to 5, and dV/d log R exceeded 0.6 mL/g at a pore radius R within the entire range of 0.01 to 1 μm.

(Bulk Density)

The aluminum hydroxide powder of Test Example 1 had a tamped density of 0.14 g/mL and an untamped density of 0.17 g/mL.

The aluminum hydroxide powder of Test Example 2 had a tamped density of 0.13 g/mL and an untamped density of 0.15 g/mL.

The aluminum hydroxide powder of Test Example 3 had a tamped density of 0.24 g/mL and an untamped density of 0.30 g/mL.

The aluminum hydroxide powder of Test Example 4 had a tamped density of 0.27 g/mL and an untamped density of 0.35 g/mL.

The aluminum hydroxide powder of Test Example 5 had a tamped density of 0.58 g/mL and an untamped density of 0.76 g/mL.

(Evaluation of Concentration of Impurities)

As a result of the measurement of the concentration of impurities of the aluminum hydroxide powder of Test Example 1, Si=3 ppm, Na<5 ppm, Ca<1 ppm, Fe=4 ppm, Cu<1 ppm, and Mg<1 ppm, expressed in terms of alumina.

(Evaluation of Formability)

The aluminum hydroxide powder of Test Example 1 was mixed with water in a weight ratio of 1:1.6 and the mixture was extruded (using Model MP-100-1, manufactured by MIYAZAKI IRON WORKS CO., LTD.) to obtain a columnar green compact measuring φ4 mm×4 mL. This green compact was dried and fired to obtain an alumina compact measuring φ2 mm×2 mL.

On the other hand, the aluminum hydroxide powder of Test Example 5 was mixed with water in a weight ratio of 1:1.6. As a result, the mixture became pasty, thus failing to form the mixture. Furthermore, the aluminum hydroxide powder of Test Example 5 was mixed with water in a ratio of 1:1.4 and the mixture was extruded to obtain a columnar green compact measuring φ4 mm×4 mL. However, cracking arose during drying.

The second embodiment of the present invention will be described by way of Examples, but the present invention is not limited to the following Examples as long as they do not change the gist thereof.

Physical properties of samples were evaluated by the following procedures.

(1) Pore Volume/Pore Radius R/Pore Distribution Curve

Samples to be supplied to the measurement were dried by a dryer at 120° C. for 4 hours, and the weight after drying was precisely weighed and regarded as a sample weight. The dried samples were set in cells of a pore volume analyzer ("Auto-Pore III9420", manufactured by Micromeritics Instrument Corporation). After controlling the pressure inside the cell system to 50 μmHg or less, mercury was filled into the system and then the pressure was stepwisely added to cells within a range from 0.007 MPa to 414 MPa. The amount of mercury penetration under each pressure was measured by setting the penetration equilibrium waiting time of mercury at 10 seconds.

The cumulative pore volume (mL/g) was determined by dividing the total amount of mercury penetration (mL) when the pressure was applied within a range from 0.007 MPa to 414 MPa by the sample weight (g).

Regarding a pore radius R (μm), the pore radius R (μm) under each pressure P was calculated from the amount of mercury penetration under each pressure P based on the above-mentioned Washburn's equation. Furthermore, using the abscissa for the pore radius (R [μm]) under each pressure P calculated based on Washburn's equation and using the ordinate for the amount of mercury penetration (dV/d log R [mL/g]) under each pressure P, the measured values were plotted to obtain a pore distribution curve.

(2) Tamped Density

A tamped density was measured by the following procedure.

In a 10 mL measuring cylinder, 9 to 10 mL of a sample was charged and the weight (g) of the sample is measured. The volume (ml) of the sample is measured when a lid is put on a measuring cylinder and, after turning upside down and returning, the sample is freely dropped. The operation of turning upside down and returning is repeated three times and an average volume (mL) is determined. The value of sample weight/sample average volume is regarded as a tamped density (mL/g).

(3) Composition Analysis (Measurement of Amount of Impurities)

A sample was calcined at 1,100° C. for about 1 hour and mixed with an Ultra Carbon powder. After grinding using acrylic balls, the content of each of Si, Na, Ca, Fe, Cu, and Mg was determined by measuring the mixed sample by solid-state emission spectrometry (using THERMO Jarrell Ash CID-DCA AURORA).

(4) Firing Efficiency

Firing efficiency of the aluminum hydroxide powders of Test Examples was evaluated by filling the same firing vessel with the same volume of each aluminum hydroxide powder, and comparing the weight of the fired material (alumina) obtained after firing.

(5) Amount of Coarse Particles

The amount of coarse particles in the sample was determined by collecting coarse particles in size of 20 μm or more by a wet sieve method, and measuring the weight.

1. Production of Aluminum Hydroxide Powder

Test Example 1A

To a mixed solution of 100.0 parts by weight of aluminum isopropoxide and 11.1 parts by weight of isopropyl alcohol, an aqueous alcohol solution of 44.1 parts by weight of water and 176.2 parts by weight of isopropyl alcohol was added, thus performing hydrolysis (a molar ratio of water/aluminum alkoxide=5.0).

Then, isopropyl alcohol was separated and recovered by distillation, and 19.0 parts by weight of water was added, thus performing hydrolysis (a molar ratio of water/aluminum alkoxide=2.1). After completion of the hydrolysis step, the concentration of water in the slurry was 12.8% by weight.

Water and isopropyl alcohol in the obtained suspension containing aluminum hydroxide, water, and isopropyl alcohol were removed to obtain an aluminum hydroxide powder of Test Example 1. As a result of the evaluation of the obtained aluminum hydroxide powder by an X-ray diffraction method, a crystal phase other than aluminum hydroxide was not confirmed.

Test Example 2A

In the same manner as in Test Example 1, except that an aqueous alcohol solution of 44.1 parts by weight of water and 44.1 parts by weight of isopropyl alcohol was used as the solvent at the time of first hydrolysis, an aluminum hydroxide powder of Test Example 2 was obtained. After completion of the hydrolysis step, the concentration of water in the slurry was 20.0% by weight.

As a result of the evaluation of the obtained aluminum hydroxide powder by an X-ray diffraction method, a crystal phase other than aluminum hydroxide was not confirmed.

Test Example 3A

In the same manner as in Test Example 1, except that an aqueous alcohol solution of 44.1 parts by weight of water and 11.0 parts by weight of isopropyl alcohol was used as the solvent at the time of first hydrolysis, an aluminum hydroxide powder of Test Example 3 was obtained. After completion of the hydrolysis step, the concentration of water in the slurry was 24.5% by weight.

As a result of the evaluation of the obtained aluminum hydroxide powder by an X-ray diffraction method, a crystal phase other than aluminum hydroxide was not confirmed.

Test Example 4A

To a mixed solution of 100.0 parts by weight of aluminum isopropoxide and 11.1 parts by weight of isopropyl alcohol, an aqueous alcohol solution of 15.0 parts by weight of water and 165.7 parts by weight of isopropyl alcohol was added, thus performing hydrolysis (a molar ratio of water/aluminum alkoxide=1.7).

Then, 99.3 parts by weight of isopropyl alcohol was separated and recovered by distillation, and an aqueous alcohol solution of 24.9 parts by weight of water and 64.2 parts by weight of isopropyl alcohol was added, thus performing hydrolysis (a molar ratio of water/aluminum alkoxide=2.8). After completion of the hydrolysis step, the concentration of water in the slurry was 7.8% by weight.

Water and isopropyl alcohol in the obtained suspension containing aluminum hydroxide, water, and isopropyl alcohol were removed to obtain an aluminum hydroxide powder of Test Example 4. As a result of the evaluation of the obtained aluminum hydroxide powder by an X-ray diffraction method, a crystal phase other than aluminum hydroxide was not confirmed.

Test Example 5A

In the same manner as in Test Example 1, except that 44.1 parts by weight of water was used as the solvent at the time of first hydrolysis and also 44.1 parts by weight of water was used as the solvent at the time of second hydrolysis, an aluminum hydroxide powder of Test Example 5 was obtained. After completion of the hydrolysis step, the concentration of water in the slurry was 307% by weight.

As a result of the evaluation of the obtained aluminum hydroxide powder by an X-ray diffraction method, a crystal phase other than aluminum hydroxide was not confirmed.

The charge amount of each component in the hydrolysis step and the concentration of water after hydrolysis in Test Examples 1A to 5A are collectively shown in Table 1. "Concentration of water in the slurry after completion of the hydrolysis step" in Table 1 is the proportion (% by weight) of water based on 100% by weight of the entire amount of the slurry after completion of the second hydrolysis step.

2. Evaluation
(Pore Distribution Curve)

Figure 3:
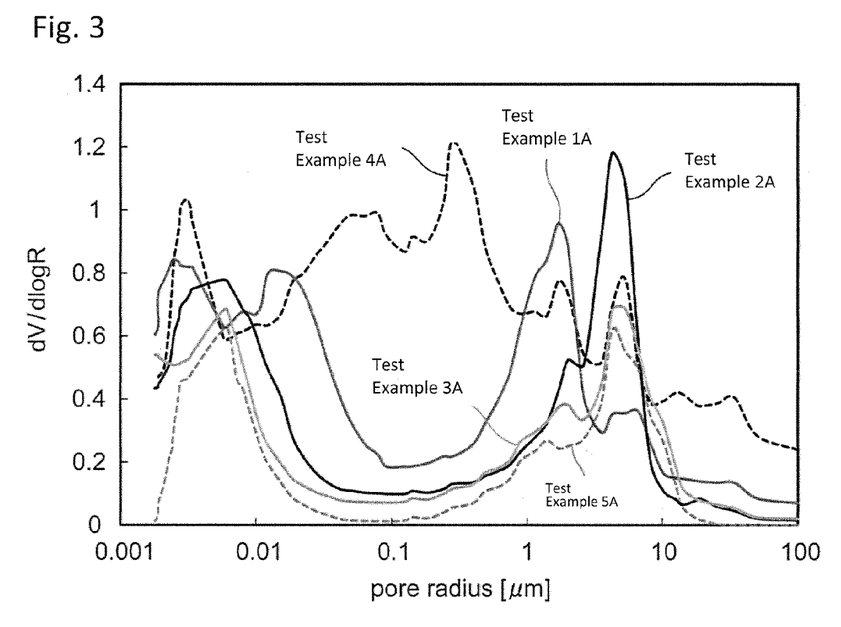
FIG. 3 is a pore distribution curve of aluminum hydroxide powders of Test Examples 1A to 5A.

Pore distribution curves of aluminum hydroxide powders of Test Examples 1A to 5A are shown in FIG. 3.

In the pore distribution curves of Test Examples 1A to 3A, dV/d log R was within a range of 0.05 mL/g or more and 0.5 mL/g or less at a pore radius F within the entire range of 0.01 to 1 μm.

In the pore distribution curve of Test Example 4A, dV/d log R exceeded 0.5 mL/g at R within a range of 0.01 to 1 μm. In the pore distribution curve of Test Example 5A, dV/d log R was lower than 0.5 mL/g at R within a range of 0.01 to 1 μm.

(Evaluation of Concentration of Impurities)

As a result of the measurement of the concentration of impurities of the aluminum hydroxide powders of Test Examples 1A to 5A, Si=3 ppm, Na<5 ppm, Ca<1 ppm, Fe=4 ppm, Cu<1 ppm, and Mg<1 ppm, expressed in terms of alumina.

The tamped density, firing efficiency, and the amount of coarse particles of the aluminum hydroxide powders of Test Examples 1A to 5A were evaluated by the above-mentioned procedures of (3) to (5). The results are collectively shown in Table 2. Firing efficiency was expressed as a relative value assumed that firing efficiency of Test Example 4A is 1.0.

TABLE 2

|  | Tamped density [g/mL] | Cumulative pore volume V (0.01 to 1.0 μm) [mL/g] | Firing efficiency | Amount of coarse particles (>20 μm) [ppm] |
|---|---|---|---|---|
| Test Example 1A | 0.30 | 0.819 | 2.1 | 0 |
| Test Example 2A | 0.45 | 0.351 | 3.2 | 1 |
| Test Example 3A | 0.56 | 0.249 | 4.0 | 7 |
| Test Example 4A | 0.14 | 1.77 | 1.0 | 0 |
| Test Example 5A | 0.72 | 0.146 | 5.1 | 180 |

(Evaluation of Grindability)

Aluminum hydroxides of Test Examples 1A to 3A and Test Example 4A were fired at 1,350° C. for 3 hours and the obtained α-alumina was ground by a jet mill (Co-Jet system α, manufactured by SEISHIN ENTERPRISE Co., Ltd.)

TABLE 1

| | Amount of charge [Parts by weight] | | | | | | | Concentration of water in slurry after completion of hydrolysis step [% by weight] |
|---|---|---|---|---|---|---|---|---|
| | Alkoxide solution | | First hydrolysis | | | Second hydrolysis | | |
| | AlPO | IPA | IPA | Water | Molar ratio | IPA | Water | Molar ratio | |
| Test Example 1A | 100 | 11.1 | 176.2 | 44.1 | 5.0 | 0 | 19.0 | 2.1 | 12.8 |
| Test Example 2A | 100 | 11.1 | 44.1 | 44.1 | 5.0 | 0 | 19.0 | 2.1 | 20.0 |
| Test Example 3A | 100 | 11.1 | 11.0 | 44.1 | 5.0 | 0 | 19.0 | 2.1 | 24.5 |
| Test Example 4A | 100 | 11.1 | 66.4 | 15.0 | 1.7 | 6.42 | 24.9 | 2.8 | 7.8 |
| Test Example 5A | 100 | 11.1 | 0.0 | 44.1 | 5.0 | 0 | 44.1 | 5.0 | 30.7 |

AlPO: Aluminum isopropoxide
IPA: Isopropyl alcohol under the conditions of 0.45 MPa and 2.7 g/minute. As a result, the amount of coarse particles in size of 20 μm or more was 0 ppm, 1 ppm, 7 ppm, and 0 ppm, respectively.

Under the same conditions, aluminum hydroxide of Test Example 5A (Comparative Example) was ground. As a result, the amount of coarse particles in size of 20 μm or more was 180 ppm.

INDUSTRIAL APPLICABILITY

The aluminum hydroxide powder of the present invention can be used as a raw material of a high purity alumina, for example, a raw material of a high purity alumina suitable as a material for formation of an inorganic oxide porous film having insulation properties, which is formed on a surface of a positive electrode, negative electrode or separator constituting a lithium ion secondary battery.

The invention claimed is:

1. A method for producing an aluminum hydroxide powder, comprising:
   a first hydrolysis step of adding an aqueous alcohol solution having a water concentration of 5% by weight to 30% by weight to a solution containing an aluminum alkoxide so that a molar ratio of water/aluminum alkoxide falls within a range of 1.5 to 2.0 to hydrolyze the aluminum alkoxide;
   a second hydrolysis step of separating and recovering an alcohol from the mixed solution after the first hydrolysis step, and adding water or an aqueous alcohol solution so that a molar ratio of water/aluminum alkoxide falls within a range of 1.0 to 7.0 and a water concentration in the slurry after the hydrolysis becomes less than 10% by weight to hydrolyze the aluminum alkoxide; and
   a step of removing water and the alcohol from the mixed solution after the second hydrolysis to recover an aluminum hydroxide powder.

2. The method for producing the aluminum hydroxide powder according to claim 1, wherein the aluminum alkoxide is aluminum isopropoxide.

3. The method for producing the aluminum hydroxide powder according to claim 1, wherein the alcohol is isopropyl alcohol.

* * * * *